United States Patent [19]
Suenaga et al.

[11] 3,838,503
[45] Oct. 1, 1974

[54] METHOD OF FABRICATING A COMPOSITE MULTIFILAMENT INTERMETALLIC TYPE SUPERCONDUCTING WIRE

[75] Inventors: Masaki Suenaga, Mastic Beach; William B. Sampson; Jack E. Crow, both of Bellport; David H. Gurinsky, Center Moriches, all of N.Y.

[73] Assignee: The United States of America as represented by the United States Atomic Energy Commission, Washington, D.C.

[22] Filed: July 12, 1972

[21] Appl. No.: 270,882

[52] U.S. Cl. ...... 29/599, 174/126 C P, 174/DIG. 6, 335/216
[51] Int. Cl. ........................................ H01v 11/14
[58] Field of Search .................... 29/599, 194, 199; 174/126 C P, DIG. 6; 335/216

[56] References Cited

UNITED STATES PATENTS

| | | | |
|---|---|---|---|
| 3,395,000 | 7/1968 | Hanak et al. | 29/194 |
| 3,397,084 | 8/1968 | Krieglstein | 174/DIG. 6 |
| 3,537,827 | 11/1970 | Benz et al. | 29/194 |
| 3,625,662 | 12/1972 | Roberts et al. | 29/599 X |
| 3,652,967 | 3/1972 | Tanaka et al. | 335/216 |
| 3,674,553 | 7/1972 | Tachikawa et al. | 29/599 X |
| 3,731,374 | 5/1973 | Suenaga et al. | 29/599 |
| 3,778,894 | 12/1973 | Kono et al. | 29/599 |

FOREIGN PATENTS OR APPLICATIONS

| | | | |
|---|---|---|---|
| 1,039,316 | 8/1966 | Great Britain | 29/599 |

*Primary Examiner*—C. W. Lanham
*Assistant Examiner*—D. C. Reiley, III
*Attorney, Agent, or Firm*—John A. Horan; C. Daniel Cornish

[57] ABSTRACT

Thin, brittle, Type-II superconductors in a matrix formed by preparing and cold working without annealing one axially aligned element of a two-component hard superconductor in a pure copper sheath to form a composite assembly of multifilamentary wires in a copper matrix at the desired final size and shape, coating the matrix with the other component of the superconductor, and diffusing the coating completely through the matrix into the wires to form the desired intermetallic superconductor in the matrix. Intermetallic superconductors found to be useful are $Nb_3Sn$, $V_3Ga$, and $V_3Si$.

1 Claim, 8 Drawing Figures

PATENTED OCT 1 1974

3,838,503

METHOD OF FABRICATING A COMPOSITE MULTIFILAMENT INTERMETALLIC TYPE SUPERCONDUCTING WIRE

BACKGROUND OF THE INVENTION

This invention was made in the course of, or under a contract with the United States Atomic Energy Commission.

In the field of superconductors, it is frequently desirable to provide a composite of superconductors in a metal matrix that has an electrical resistivity higher than that of the superconductors at low temperatures. Such a matrix forms an alternative conductive path and also conducts away the heat involved during jumps of flux penetration into the superconductor material during changes in magnetic field and electrical current conditions, as described in the March 1967 Scientific American on pages 115–123 by William B. Sampson, a co-inventor herein. Such superconductors include alloys, such as described in U.S. Pat. No. 3,662,093, and intermetallic compounds, which have improved superconducting characteristics. Typical of such intermetallic compounds are the $Nb_3Sn$ and $V_3Ga$ superconductors, which are especially useful because of their higher critical currents, temperatures and magnetic fields, above which the materials cease being superconductive. These superconductors are variously described as "hard" or "Type-II" because of these and related physical characteristics. However, a problem involved heretofore in the usefulness of the above-mentioned hard superconductors is the difficulty in fabricating these materials into useful shapes due to their brittleness. This problem appears to have been largely overcome in an invention which is described in application Ser. No. 164,362, now U.S. Pat. No. 3,731,374, filed on "Improved Diffusion Method for Hard Superconductor" on July 21, 1971 in the names of Masaki Suenaga, William B. Sampson, and David H. Gurinsky, who are coinventors herein. However, the composite covered in the application just mentioned, in which the components are formed by inserting, in one case, vanadium wires in a Cu-Ga matrix, tends to work harden during cold-working operations, thus requiring that annealing steps be employed between successive cold-working steps where at least 50% reduction is required. While very effective in producing the desired final product it would be economically advantageous to avoid the annealing steps for large area reductions involving heating in an inert gas.

SUMMARY OF THE INVENTION

The present invention avoids the work hardening and the time consuming annealing steps described above for major area reductions by utilizing as the matrix a ductile normal resistance metal free of any component of the intermetallic compound, and instead adding one of the intermetallic metals after the working process is complete. As a result, it has been discovered that the annealing steps can be avoided completely.

In accordance with a preferred embodiment of this invention, a composite structure is prepared by embedding at least one element of malleable metal, which is the first component of the intermetallic superconductor, in a second malleable normal resistance metal which does not contain the second component of the intermetallic superconductor, cold-working the composite structure to form an elongated conductor, coating said conductor with the second component of the intermetallic superconductor, and heat treating the coated conductor to diffuse the second component until there is formed the intermetallic superconductor in situ.

It is thus a principle object of this invention to provide a commercially feasible method for forming an intermetallic superconductor in a normal resistance metal matrix.

The above and further novel features and objects and advantages of this invention will become apparent from the following detailed description of preferred embodiments of this invention.

DESCRIPTION OF THE PREFERRED EMBODIMENT

In certain applications, it has not been feasible to use the Type-II, ductile, low critical temperature, solid cylindrical, superconductors, such as alloys of niobium and titanium as they have relatively low critical currents and/or magnetic fields. On the other hand, brittle superconductors, such as $Nb_3Sn$, which are particularly useful in applications requiring strong time-varying magnetic fields, such as in magnets or in motors or generators, where a.c. or d.c. is required, have been difficult and expensive to make.

The present invention makes it economical to provide thin, brittle, A-15, Type-II superconductors particularly adapted for use for these applications, and applications requiring these relatively high critical currents and densities, high critical fields and relatively high critical temperatures.

Figure 1A:
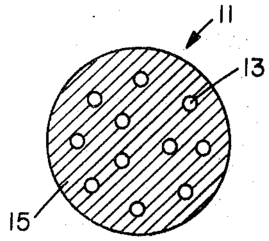
FIG. 1*a* is a cross-section of a composite assembly of multifilamentary wires after cold-working.

Referring to FIG. 1*a*, a composite assembly 11 is formed having a one-component matrix 15 of a malleable metal, such as a pure normal resistance copper, and wires 13 of a malleable component of the intermetallic superconductor to be produced at the desired size and cross-sectional area. In the $V_3Ga$ and $Nb_3Sn$ systems, one of two techniques may be advantageously employed in making the assembly 11 of FIG. 1*a*. In the first technique, a large copper cylindrical billet is drilled with uniformly spaced holes that are fitted snuggly respectively with niobium or vanadium rods substantially corresponding in relative size and arrangement to the relative size and arrangement of the FIG. 1*a* assembly, but relatively enlarged in size therefrom. This assembly is drawn to form the composite of FIG. 1*a* without annealing between the drawing steps because both components remain ductile. In the alternate technique, a single niobium (or vanadium) rod is placed snuggly in a Cu tube or sheath and this assembly is drawn to a fine wire. Then, a plurality of these wires are placed in another Cu tube or sheath and this assembly is drawn or extruded to form the FIG. 1*a* assembly. In either technique, wires may be given a twist during the final drawing, to produce any desired twist of the Nb or V wire 13.

Figure 1B:
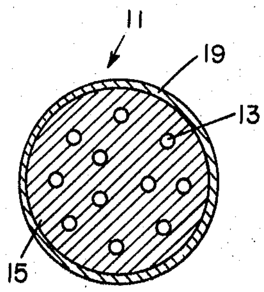
FIG. 1*b* is a cross-section of the superconductor assembly of FIG. 1*a* with the coating added after cold-working.
Figure 1C:
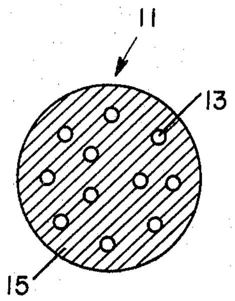
FIG. 1*c* is a cross-section of the superconductor assembly of FIG. 1*b* with the coating thereof diffused into its underlying matrix to form a two-component matrix during heat treatment.
Figure 1D:
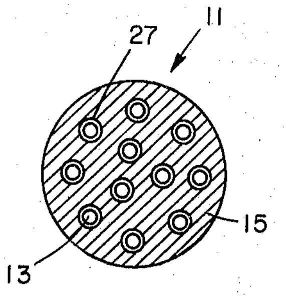
FIG. 1*d* is a cross-section of the assembly of FIG. 1*c* after the superconductor layers are formed.

Composite 11 is then coated with layer 19, consisting of the second component of the intermetallic superconductor, gallium in the case of the $V_3Ga$ system, and Sn in the case of the $Nb_3Sn$ system, by passing composite 11 through a molten bath of the second component, the coated matrix being shown schematically in FIG. 1*b*. Following coating, matrix 15 is heated to a suitable diffusion temperature and held there until the outer coating disappears in a diffusion that forms a solid solution in matrix 15, as shown in FIG. 1*c*, and continued until intermetallic layers 27, referred to hereinafter also as superconductors or filaments of $V_3Ga$ or $Nb_3Sn$, are formed on wires 13, as shown in FIG. 1*d*. This forms the desired composite assembly 11 which consists of vanadium or niobium wires 13 coated with $V_3Ga$ or $Nb_3Sn$, respectively, in a matrix 15 of copper which contains some residual Ga or Sn, respectively. If it is desired to maintain a matrix 15 which is pure copper, a portion of the diffusion can be conducted in an atmosphere of air or other gas containing oxygen to form oxidized conglomerations of the Ga or Sn imbedded in the pure copper matrix. These conglomerations do not appear to affect adversely the use of the composite.

The criteria used in accordance with this invention in determining when the above-mentioned diffusion was complete involved simple metallographic observations, or mechanical, X-ray, or electrical tests. The upper limit for the thickness of the superconductor layer in the configuration of FIGS. 1*a* – 1*d* is 50 microns. For the lower limit, the thickness of the superconductor is thick enough to be continuous so that the filaments conducted along their entire lengths from one end to the other end. Diffusion is limited to a temperature range having a lower limit above the point where diffusion takes place and an upper limit below which structural weakening of the composite takes place. This range for the materials described herein is found to be 550°C to 800°C.

Figure 2A:
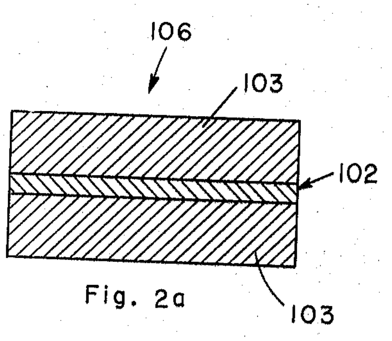
FIG. 2 *a–d* are cross-sections of a ribbon shaped composite assembly formed in accordance with the principles of this invention.
Figure 2B:
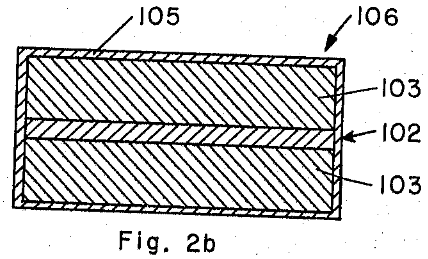
Figure 2C:
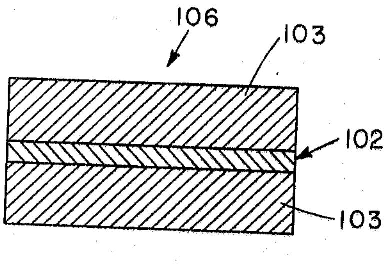
Figure 2D:
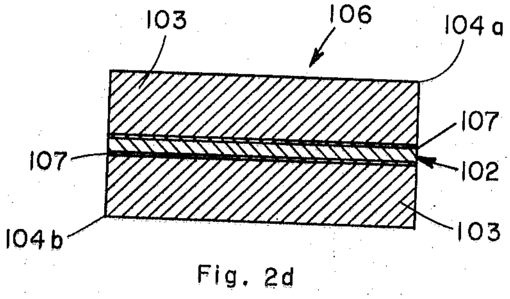

As seen from FIGS. 1*a* – 1*d* the superconducting composite 11 may be cylindrical in shape, which is useful in a variety of applications, already mentioned. However, it should be noted that other shapes may be employed in carrying out the principles of this invention, such as a ribbon configuration, illustrated FIGS. 2*a*–2*d*. There it is seen that matrix 103 and ribbon-shaped conductor 102 make up a flat composite 106, with outer coating 105, and intermetallic inner compound coatings 107 in the final product of FIG. 2*d*. The method involved is the same as that described for FIGS. 1*a*–1*d* except that any end effect from edges 104*a* and 104*b* would be eliminated by slicing or removing a suitable thickness on each side.

In addition to the preparation of $V_3Ga$ and $Nb_3Sn$ superconductors in matrix 15, another superconductor, which can be formed in a similar fashion, is $V_3Si$ where Si is diffused through the matrix as previously described.

The following examples illustrate this invention:

EXAMPLE I

A final composite assembly of 10 mil diameter was produced by reducing the cross-sectional dimensions of a ½'' pure, one-component, drilled copper billet containing seven ⅛ in. diameter vanadium rods in a first assembly without annealing. The drawn assembly was coated with a Ga coating. The coated composite assembly was then heated in a protective atmosphere of argon to 650°C for five minutes, at which time the coating disappeared so that the assembly could be coiled for further heat treatment without soldering between the turns of the coiled composite. Then the coiled composite was further heat treated in a protective atmosphere of an inert gas for 100 hours at 650°C to form the desired bendable, multifilament, hard, A-15 $V_3Ga$ superconductors, which were uniformly 1 micron thick.

EXAMPLE II

A pure, one-component circular-cylindrical, one-half inch diameter, drilled copper sheath filled with 7⅛'' diameter, high purity, Nb cylindrical rods corresponding to the arrangement of FIG. 1*a* was cold-worked by 20 drawings without annealings in between the cold-working steps in dies varying from about ½'' to 10 mils to approximate 20% cross-sectional area reductions at each drawing step. This produced uniformly spaced niobium wires uniformly 0.39 mm in diameter in a copper matrix, with the wires occupying 30% of the area of the drawn composite assembly, which was easily bendable down to bending diameters of 1.5'' without damage to the composite or its elements, the composite was continuously fed through a washing bath having a solvent therein, a tin bath at 240°C, and a cooling bath approximately room temperature. Thereupon the cleaned, coated and cooled composite was heated to 650°C by passing it slowly through a 650°C inert atmosphere at slightly more than 1 atm. pressure for 5 minutes to produce a Cu-Sn solid solution around the niobium wires, and this composite was coiled for further efficient heat treating in long lengths without degradation. This further treatment was at 650°C for 100 hours to produce bendable, hard, A-15, $Nb_3Sn$ superconductors that occupied ¾ of the area of the original one-component 0.39 mm diameter Nb wires.

EXAMPLE III

The same steps and conditions of Example I in which the second heating step was in air at a partial vacuum at 650°C for 150 hours for producing gallium oxide conglomerations from the Cu-Ga solid solution in the matrix, and thus leaving areas of nearly pure copper around the hard $V_3Ga$, A-15 superconductors.

EXAMPLE IV

The conditions and steps of Example II were repeated in which 8 mil diameter composite wire of pure copper containing 360 twisted fine Nb filaments therein was coated with Sn at 240°C. Then the coated assembly was heated in a protective atmosphere for 5 minutes at 650°C and then coiled. The coil was then heated for 100 hours at 650°C to complete the diffusion. This produced 360 $Nb_3Sn$ filaments in the copper matrix around the 360 Nb cores.

EXAMPLE V

The steps of Example II were repeated, and the second heat-treating diffusion step was performed at 600° for about 400 hours for producing the superconductors of about the same thickness.

EXAMPLE VI

A Nb rod containing a 1% Zirconium dopant was inserted in a pure copper tube with a snug fit. The assembly was then drawn to a composite size of 60 mils. A plurality of these individually drawn composites were collectively packaged uniformly and snuggly in a copper tube. This assembly was then drawn to produce a composited assembly 11, such as shown in FIG. *1a*, having thin core wires 13 in a pure copper matrix. Then this assembly was coated with tin and heat treated at 650°C for 100 hours to produce the $Nb_3Sn$ filaments around the Zirconium containing Nb cores. The small amount of Zr (1–5%) made the grain size of the $Nb_3Sn$ very small, which improved the critical current. This illustrates that the invention may be employed when the malleable superconductor component originally inserted in the copper matrix is doped.

EXAMPLE VII

Starting with a single Cu tubing, a Nb rod was fitted snuggly inside the copper tube. Then the assembly was rolled flat to produce a ribbon 5 mils thick of niobium coated with pure copper. Then the ribbon was coated with tin at 240°C. The coated ribbon was heated to 650°C for 5 minutes and coiled; and then the coil was heated to 650°C for about 20 hours to produce bendable $Nb_3Sn$, A-15 superconductors, which were edge-cut to form spaced apart thin ribbon-shaped $Nb_3$ superconductors. The diffusion was not more than ¼ of the way into the niobium.

EXAMPLE VIII

Final composite assemblies 10 mils in diameter were drawn to from an assembly of Nb rods in a drilled copper sheath. The wire assembly was coated with a tin coating at approximately 240°C. Short sections of the coated composite wire assembly 11 were then encapsulated in quartz tubing having a protective atmosphere therein and heat treated from 550°C to 800°C for various lengths of time up to five minutes to produce a first diffusion where substantially all the tin from the coating was diffused into the copper matrix to produce a solid solution of Sn and Cu. Then a longer second diffusion for at least 20 hours at between 550°C and 800°C caused at least some of the disolved Sn solute from the Sn-Cu solid solution to diffuse into the Nb multifilamentary wires to produce the desired two-component $Nb_3Sn$ superconductor filaments. These superconductors were cylindrical "hard" superconductor filaments sandwiched between the wires and the matrix. It was found that the amount and thickness of the hard superconductor formed depended on the temperature and the time of the diffusion.

Advantageously, as mentioned, the diffusions should be at a temperature up to only 800° since the core component of the superconductor structurally weakened above that temperature. Also, the time of the diffusion should last for a period that is long enough to form intermetallic hard superconductors no more than ¼ of the way into the original core components, e.g. wires 13, which are illustrated in FIG. 1*c*, the wires occupying 30%–40% of the area of the composite in the above-example II. In this regard, an amount of diffusion to ¼ of the way into the original core component consumed 75% of the area of the wires 13 of FIG. 1*c*, and so was efficient. By limiting the thickness of the hard superconductor filament layers 27 to the described ¼ distance into the wires 13, the composite assembly of FIG. 1*d* is bendable without degradation of the superconductor to bending diameters of 1.5 inch.

The resistive critical temperature $T_c$ of $Nb_3Sn$ assemblies made according to the method of Example II of this invention, were measured by a standard four wire method in a variable temperature vacuum can immersed in a liquid helium bath. These critical temperatures were high, i.e. above 4.2 K and up to 17 K or more. Since the critical temperature was a function of the heat treating time length, a series of chosen heat treatment times was used to produce approximately equal thickness filaments 27 at various temperatures, e.g., to provide filament layers approximately corresponding to 0.2 and 0.5$\mu$ M respectively. The $T_c$ was relatively insensitive to formation temperature in contrast to the $T_c$ for $V_3Ga$ multifilaments 27. However, some variation in $T_c$ was probably due to differences in the amount of diffused solute from coating 19 in the matrix, since the rate of the layer formation was a function of the solute concentration in the Cu matrix. Since producing sections of assemblies having a uniform coating thereon was also possibly involved in this, it is advantageous to transport a moving wire assembly through a bath system, as described, although careful dipping was also used.

In studying the critical temperatures of the composite wire assembly as a function of heat treatment at three different temperatures (i.e. 800°C, 750°C and 700°C), it was found that the $T_c$ of the samples all reached approximately 17.5 K independent of the formation temperatures, provided that enough time is allowed at each temperature. Again this contrasts to the $T_c$ of $V_3Ga$, which is relatively independent of heat treating time.

The critical current at 40 kG was also studied as a function of reaction time at 750°C for two values of the tin concentration in the Cu-Sn matrix. High and low designations corresponding to concentrations of approximately 3 atm. % and 1.5 atm. % respectively were used. For samples that had a layer thick enough to estimate the $Nb_3Sn$ content, the critical current density, $J_c$, was approximately $7.5 \times 10^5$ A/cm$^2$ in all cases. This value for $J_c$ is nearly twice as large as that for $V_3Ga$ reported in Appl. Phys. Lett. 18, 584, 1971, and comparable to the value for $Nb_3Sn$ previously reported in AIME 242, 1067 (1968).

A comparison was also made of the magnetic field dependence of the critical current density of $V_3Ga$ and $Nb_3Sn$ made by the same and/or similar processes, since it is known that $V_3Ga$ has a very high $J_c$ at high magnetic fields, as described in Appl. Phys. Lett. 16, 230, 1970. Normalizing $J_c$ (H) for both $Nb_3Sn$ and $V_3Ga$ to values of $J_c$ at 40 kG, it was found in relation to $Nb_3Sn$ and $V_3Ga$ that the critical current for the $Nb_3Sn$ has a steeper dependence on the applied magnetic field than that of the $V_3Ga$. However, the absolute value of $J_c$ (40 kG) for $Nb_3Sn$ is almost twice as large as the $J_c$(40 kG) for the $V_3Ga$. Hence, an actual cross-over of $J_c$ between the $Nb_3Sn$ and the $V_3Ga$ takes place in the neighborhood of 120 kG. Since many of the probable applications of the wire composite assembly of this invention will be at and/or in magnetic fields well below 100 kG, the $Nb_3Sn$ wire composite assemblies of this invention may be more suitable for many practical application.

The advantageous mechanical properties of the wire composite assemblies of this invention were examined by bending those wire composite assemblies around a mandrel. To this end, after measuring the critical current, and then bending and straightening the wire composite assembly, the critical current was remeasured at 4.2 K and 40 kG. Progressively small mandrels were used until a significant reduction in the current carrying capacity occured. The results, which Report BNL-16415 of the Brookhaven National Laboratory by the inventors herein reports for wire composite assemblies heat treated at 750°C for 150 and 300 hours, showed degradation by plotting the ratio of the current after bending to that of the straight wire as a function of the mandrel size. In this regard, degradation first occured in the wire composite assemblies at a bending diameter of 1.5 inch, and $I_c$ drastically reduced for bends of a diameter of 0.5 inch.

In some cases bending increased the critical current of the $V_3Ga$ wire composite assemblies of this invention. This might be explained by various theoretical possibilities, but at present this is not understood completely. Further tests on this are planned to determine empirical results and possibly the theory involved.

The process of producing the above-described multifilamentary A-15 compounds in accordance with the above-mentioned examples of this invention offers attractive commercial prospects. In this regard, the superconducting properties of the composite assemblies of this invention compare favorably with those of $Nb_3Sn$ tapes, such as made in accordance with the method of this invention, as understood in connection with FIGS. *2a–2d*.

In regard to the example having a step that causes the Ga to be divorced by oxidation from the Cu of the matrix, tin can also be treated in this way to come out of solution in the matrix. It is believed that at least some of the tin component of the two-component matrix converts to an insoluble compound in the matrix in oxygen during heat treating, or even after the final assembly is formed. To this end, the oxygen causes at least some of the tin at least partially to form an insoluble oxide whereby this oxide precipitates or forms a plurality of small specks or tin containing conglomerates in the described matrix so as to leave areas of a substantially pure or high conductivity one-component Cu matrix material around the superconductors, the Cu having a high thermal and electrical conductivity.

In still further embodiments, it is believed that a copper matrix having Nb or V ribbons therein can be coated with materials that respectively diffuse into the ribbons, the coatings being selected from the group consisting of Sn, Ga, Si, and Al for producing the two-component "hard" superconductors in accordance with the described method of this invention.

While solid multifilament wires and tapes have been described, it will be understood that the described multifilament wires can be braided into ribbons, as understood from the above and U.S. Pat. No. 3,638,154.

Likewise, it will be understood from the above that a multiplicity of the described multifilamentary wires may be assembled in a matrix, as understood from the above and co-pending application Ser. No. 224,456, filed Feb. 8, 1972, now U.S. Pat. No. 3,771,204. It is understood that the described steps may be performed by hand, automatically or continuously.

What is claimed is:

1. The improved method of forming an intermetallic $Nb_3Sn$ superconductor in a normal resistance Cu metal matrix, comprising the steps of:

a. preparing a Nb-Cu composite structure having at least one longitudinally extending member of a first malleable pure metal Nb component of a specific two-component intermetallic $Nb_3Sn$ superconductor in a second pure malleable Cu metal that does not contain the specific complimentary metal Sn component of said two-component intermetallic superconductor, said Nb component occupying 30% to 40% of the cross-sectional area of the composite structure;

b. cold-working said composite structure, including the first and second pure metals, without intermediate annealing, to form an elongated conductor selected from the group consisting of tapes and wires, including at least one composite structure with a maximum thickness of up to only 60 mils;

c. transporting said conductor through a molten tin bath at 240°C to cover said conductor with said specific complimentary component of said two-component intermetallic superconductor for forming a solid solution alloy having a Sn concentration of between 3 atm % and 1.5 atm % that is required for the further processing steps;

d. transporting the Sn covered conductor into a furnace having a protective atmosphere at slightly more than 1 atm. pressure to heat the Sn covered conductor to between 500°C and 800°C for up to five minutes to produce the solid solution alloy as a normal resistance matrix containing all the complimentary component;

e. heating the conductor containing the solid solution alloy for at least 20 hours at between 550°C and 800°C to diffuse the Sn from the matrix toward the Nb component until the intermetallic superconductor is formed in situ as a bendable layer only up to one-quarter of the way into the outer surface of the first malleable pure metal component; and f. bending the superconductor around a mandrel to a bending diameter of up to only 1.5 inch for producing a magnetic field at a critical current density of up to approximately $7.5 \times 10^5$ A/cm$^2$.

* * * * *